Oct. 11, 1960      A. DRECHSEL      2,955,840
SPRING SYSTEM FOR VEHICLES
Filed Oct. 6, 1955      10 Sheets-Sheet 1
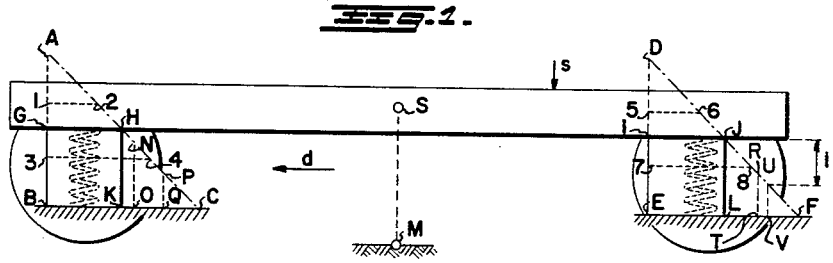
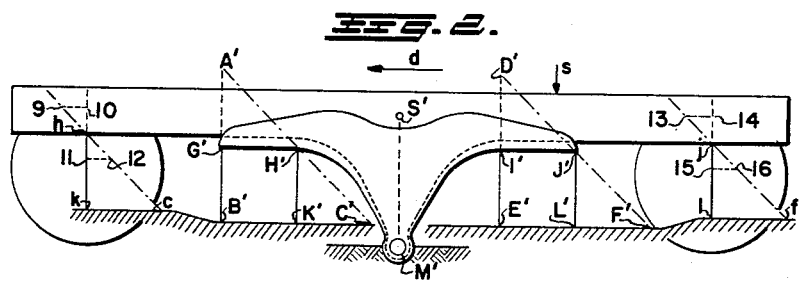
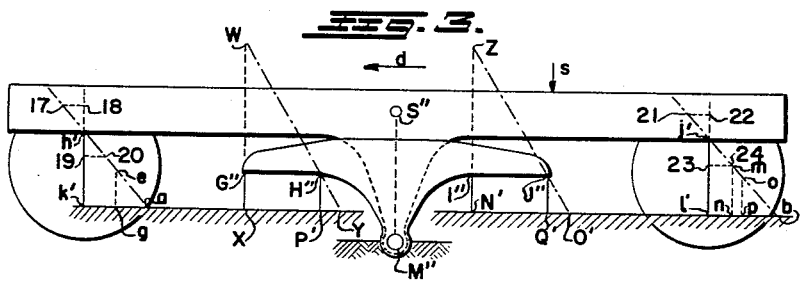
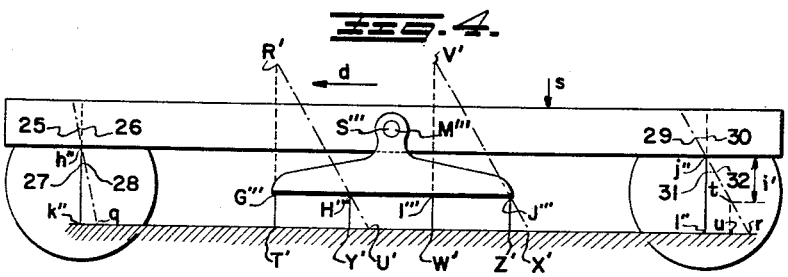
INVENTOR
ARMIN DRECHSEL
BY Dicke and Craig
ATTORNEYS Oct. 11, 1960  A. DRECHSEL  2,955,840
SPRING SYSTEM FOR VEHICLES
Filed Oct. 6, 1955  10 Sheets-Sheet 2
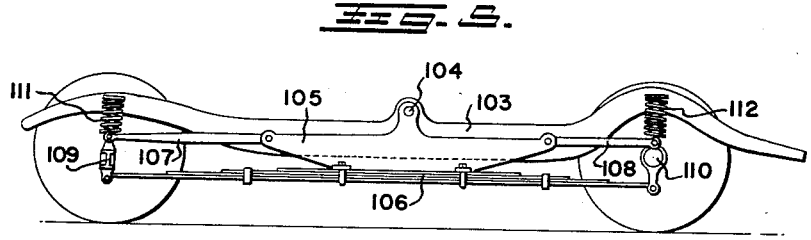
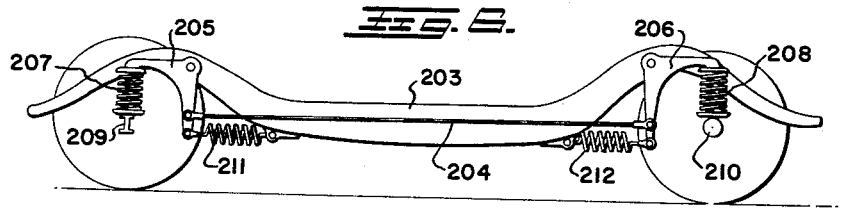
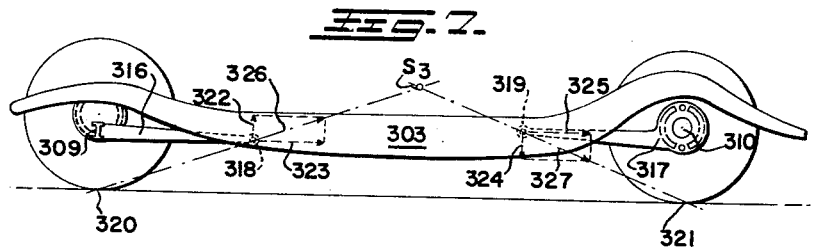
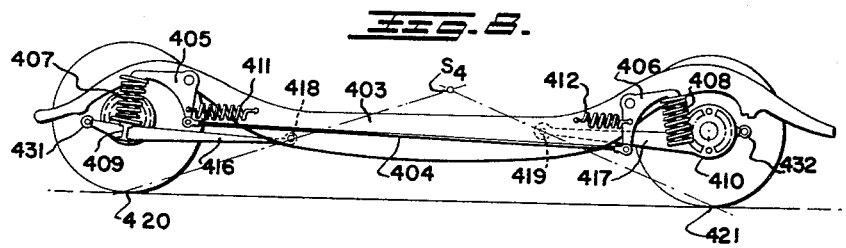
INVENTOR
ARMIN DRECHSEL
BY Dicke and Craig
ATTORNEYS

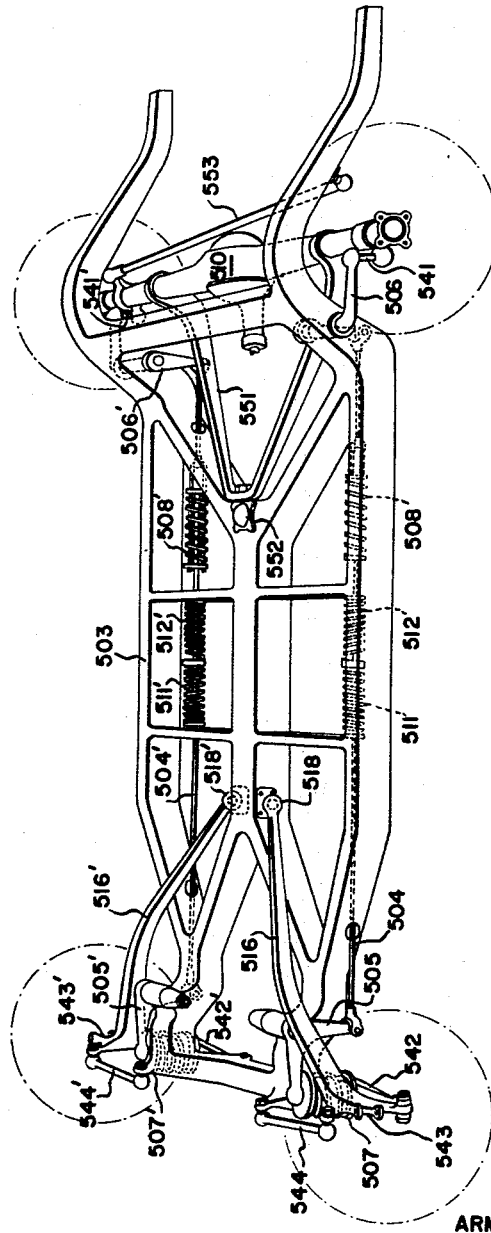

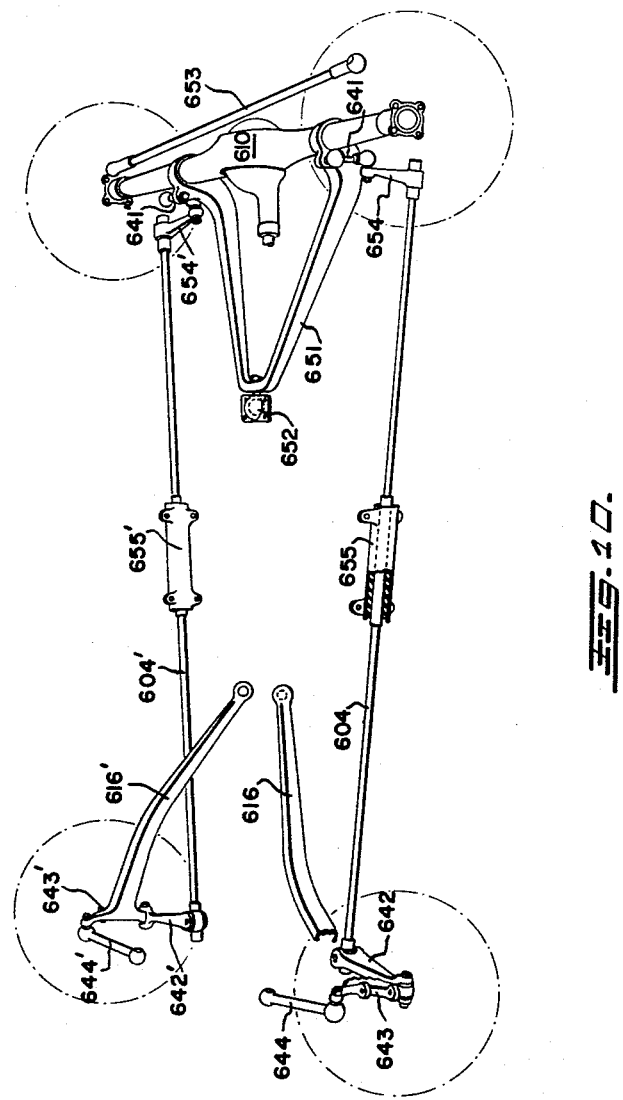

Oct. 11, 1960 A. DRECHSEL 2,955,840
SPRING SYSTEM FOR VEHICLES
Filed Oct. 6, 1955 10 Sheets-Sheet 5
Fig. 11.
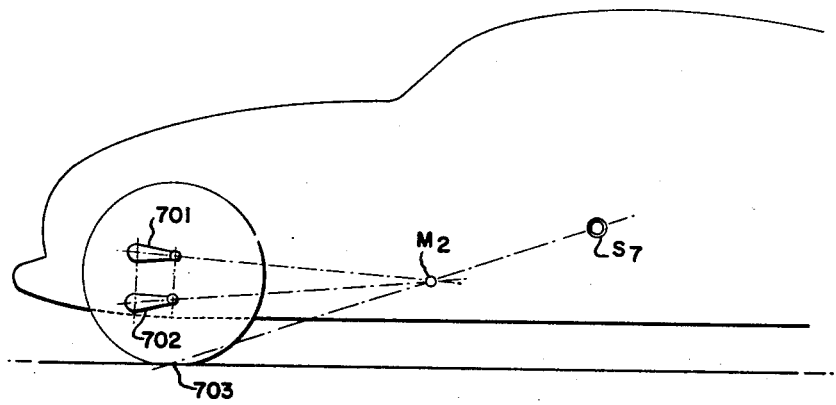
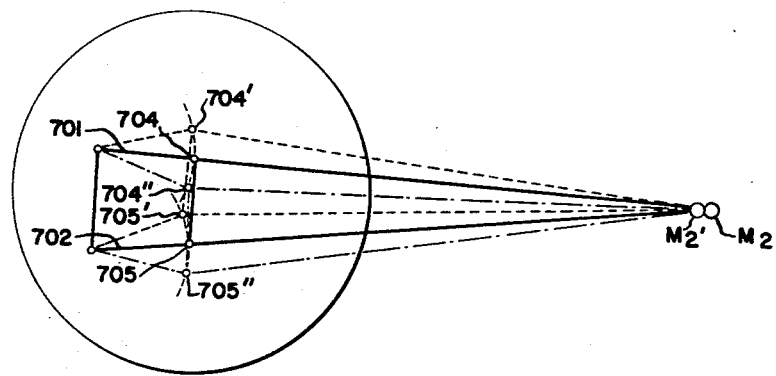
Fig. 12.
INVENTOR
ARMIN DRECHSEL
BY Dicke and Craig
ATTORNEYS

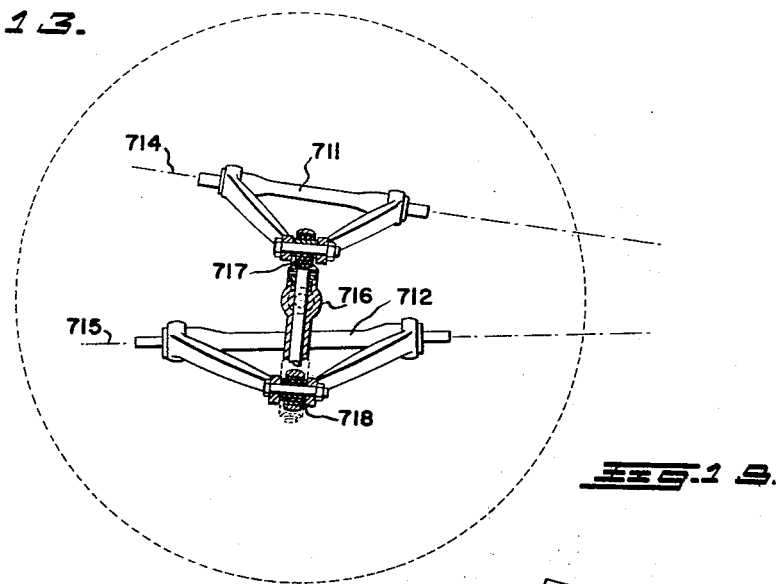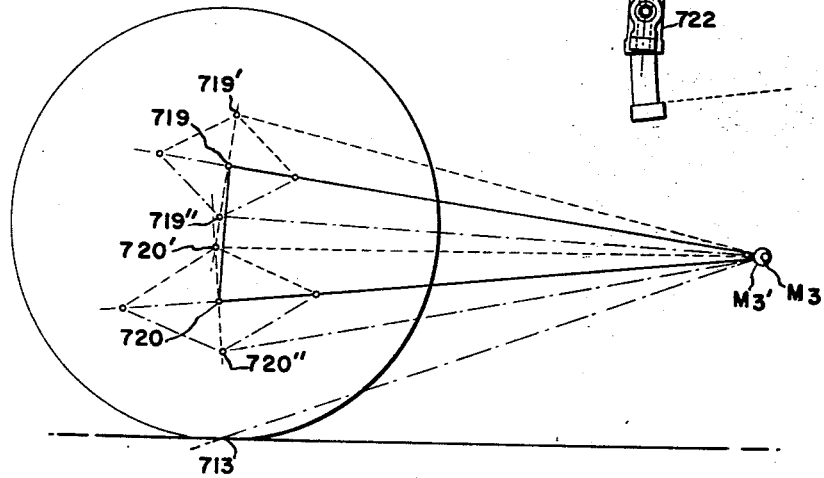

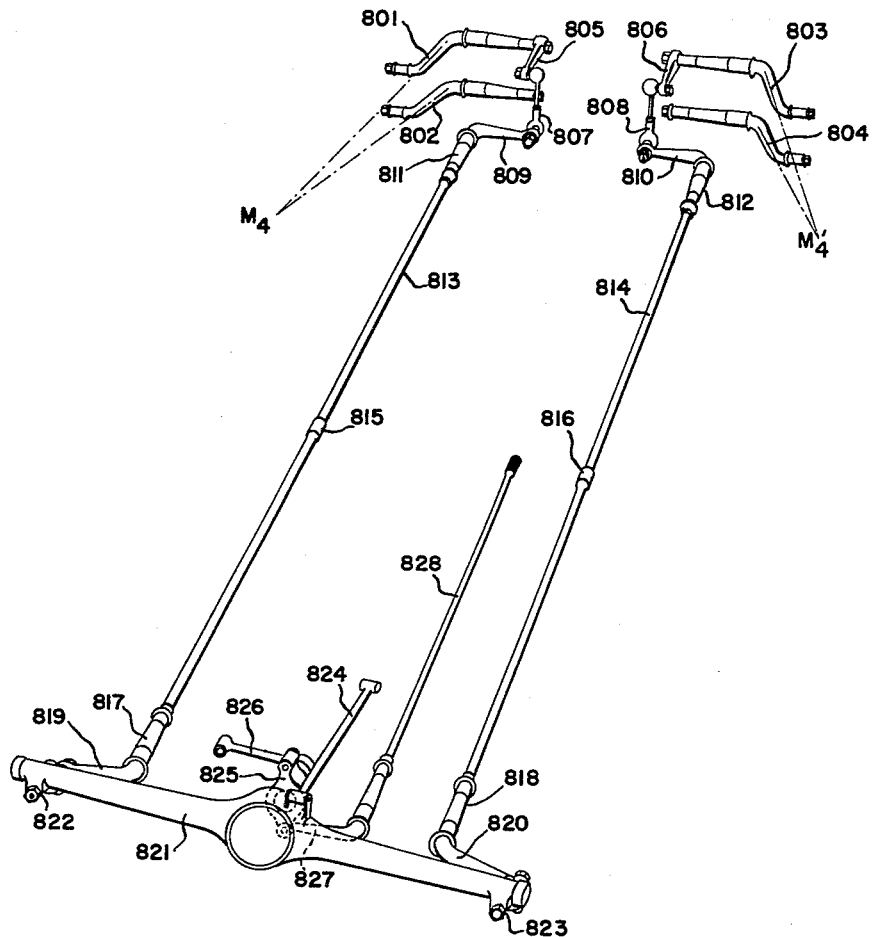

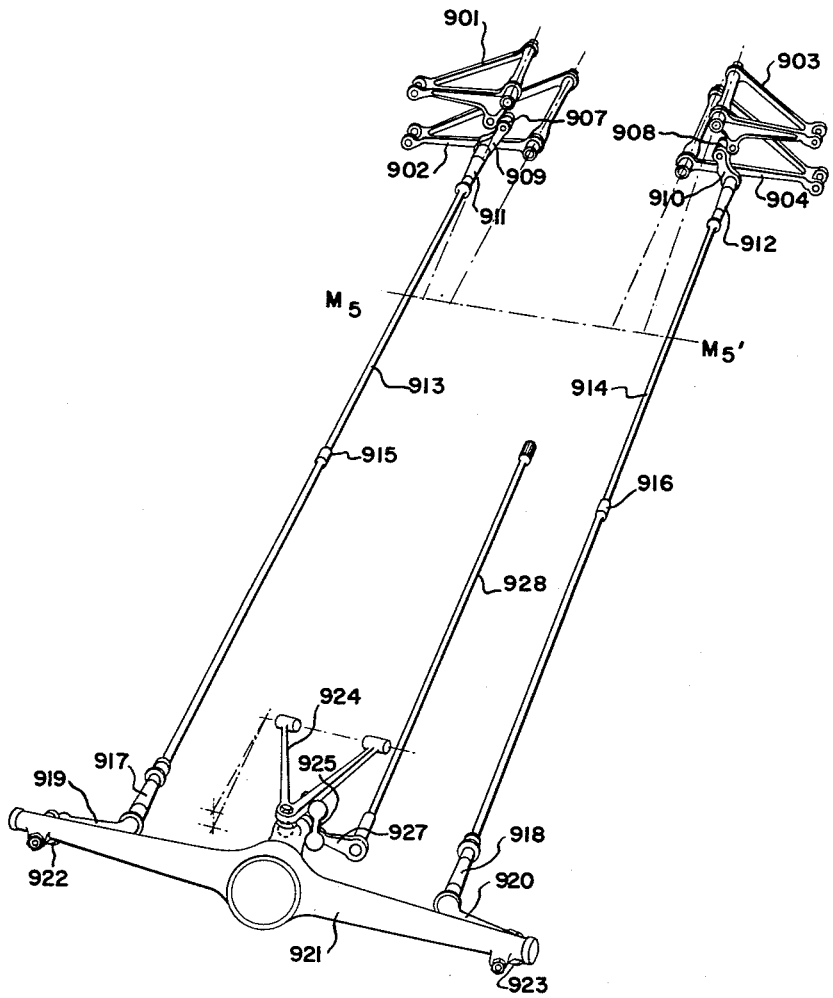

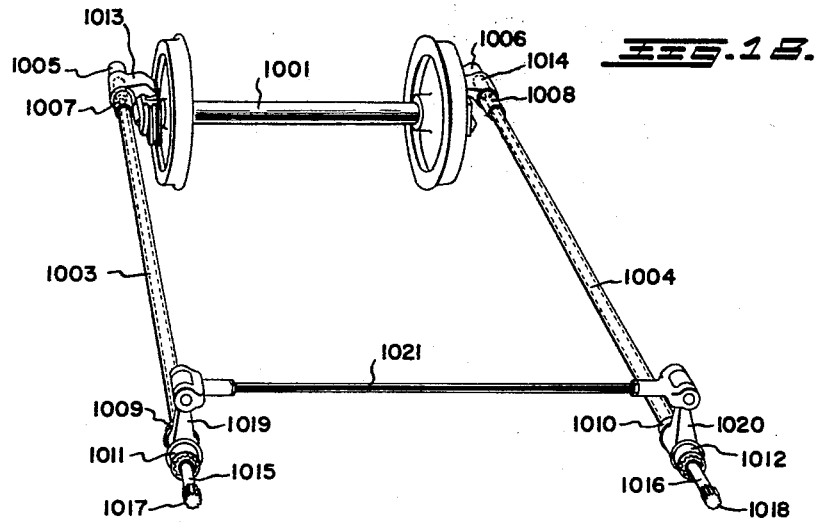
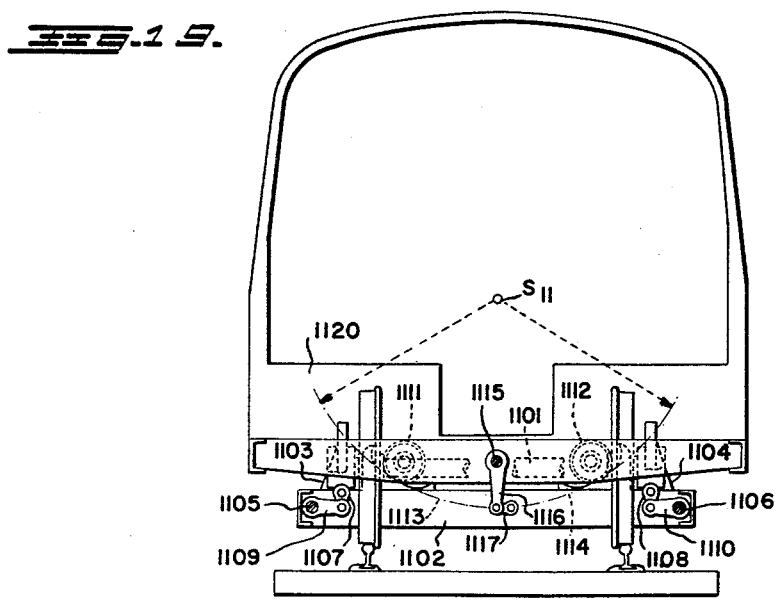

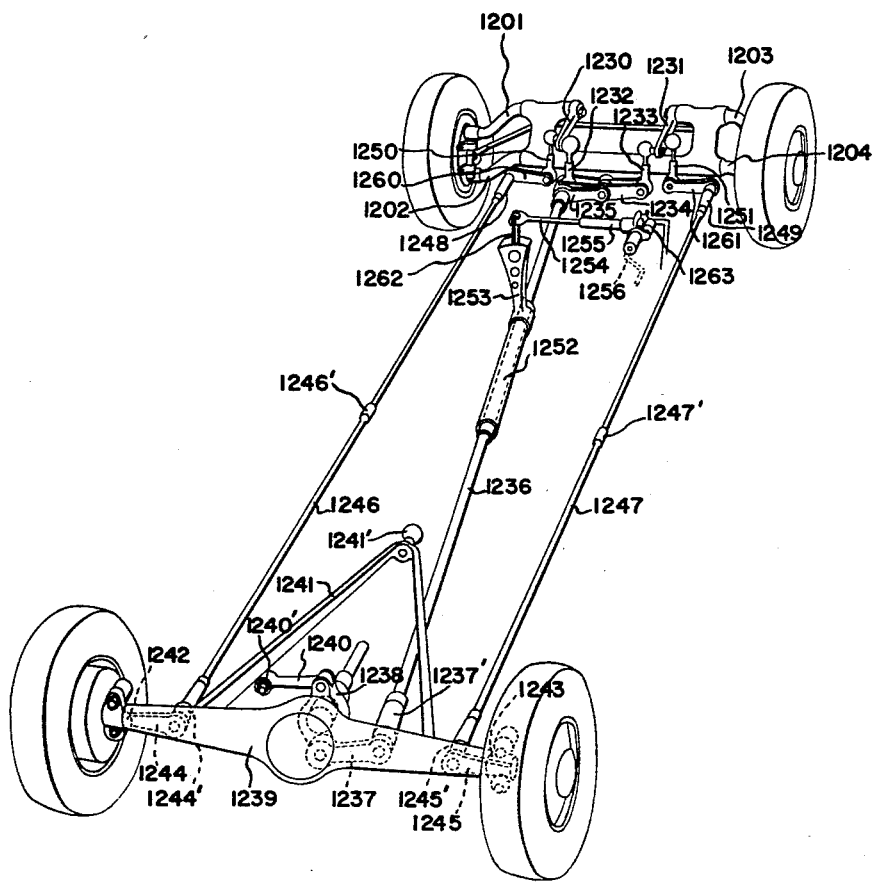

United States Patent Office 2,955,840
Patented Oct. 11, 1960

2,955,840
SPRING SYSTEM FOR VEHICLES
Armin Drechsel, Falkenstrasse 4, Friedrichshafen, Bodensee, Germany
Filed Oct. 6, 1955, Ser. No. 538,923
Claims priority, application Switzerland Oct. 6, 1954
17 Claims. (Cl. 280—104)

The present invention relates to a new spring system for vehicles provided with wheels of any type, which move on roads, on rails, over countryside, on airports and caterpillar tracks, and more particularly relates to a new and improved spring system for such vehicles.

Accordingly it is an object of the present invention to improve by a thorough consideration of the dynamic and static conditions of the spring system the driving characteristics of such vehicles in several respects. In particular, the present invention thereby aims at a construction and spring system which with respect to the known prior art constructions offers the advantages that the wheels may follow more readily the unevenness of the road bed so that a more even road pressure and therewith an improved road holdability is produced thereby, that the springs absorb and yield less energy from shocks, that the various parts of the vehicle frame are less loaded and stressed and that the consumption of energy for the generation of swinging movement lessens, whereby therebeyond as main object is to be attained that these swinging movements proceed considerably more softly and uniformly along the vehicle body.

It is another object of the present invention to provide a new and improved spring system for vehicles of any type which is simple and effective in stabilizing the vehicle and which utilizes a relatively simple spring arrangement.

It is another object of the present invention to provide a spring system for vehicles which takes into consideration the static and dynamic requirements and which fulfills the same in a highly improved manner.

Still another object of the present invention resides in the provision of a spring system and wheel suspension which stabilizes the vehicle against any forces including angular movements or vibrations and which results in greatly improved road holding capacity and wheel following capability for the vehicle.

A still further object of the present invention resides in a spring system and suspension for the wheels by means of which no torsional forces are transmitted from the wheels to the vehicle body thereby resulting in simplification of the construction of the vehicle such as frame, etc.

Another object of the present invention is the provision of a spring system for vehicles which performs its function of carrying the static weight of the vehicles as well as stabilizing the vehicle body under dynamic conditions to such a high degree of perfection that the number of parts may be reduced and the overall weight may be kept down while at the same time providing a system which is rigid and stable.

A still further object of the present invention lies in the provision of a spring system which results in completely balanced and quiet riding.

A further object of the present invention is the provision of a spring system which provides spring means operative in such a manner that the load or weight of the vehicle body is carried by some of the spring means while the stabilizing task is carried out by other spring means which are not subject to preloading or pretensioning as they are relieved of the function of carrying the vehicle body.

Another object of the present invention resides in the provision of a spring system for vehicles which enables the use of a relatively high center of moments for the suspension of the vehicle body.

A still further object of the present invention resides in the provision of a spring system, and more particularly of a wheel suspension which minimizes the effects caused by the forces due to acceleration and deceleration or braking as well as due to centrifugal forces.

Among the various vibrations and swinging movements which occur in vehicles, the present invention is particularly concerned with a reduction in the angular vibrations or swinging movements, either about one horizontal axle or simultaneously about both horizontal axles, and the present invention, in certain cases, sets out to achieve this reduction to such an extraordinary extent that the amplitudes and accelerations assume only a fraction of the present values.

Further objects, features and advantages of the present invention will become more obvious from the following description when taken in connection with the accompanying drawing which shows for purposes of illustration only several embodiments in accordance with the present invention, and wherein:

Figure 1 is a schematic representation of a vehicle spring system of the prior art including a schematic diagram of the spring system thereof;

Figure 2 is a schematic representation of a first embodiment including some of the concepts in accordance with the present invention and including a spring diagram for the system;

Figure 3 is a still further perfected schematic representation of a spring system in accordance with the present invention including a spring diagram of the spring system;

Figure 4 illustrates a schematic representation of a spring system in accordance with the present invention including a spring diagram for the system;

Figure 5 is a side view of a first actual embodiment of a spring system for a vehicle in accordance with the present invention to put into actual practice the concepts of Figure 4;

Figure 6 is a side view similar to Figure 5 of a modified embodiment of a spring system in accordance with the present invention;

Figure 7 is a still further modification of a spring system in accordance with the present invention with parts thereof shown in Figure 6 omitted;

Figure 8 is a side view of a modification embodying the improvements of both Figures 6 and 7 of a spring system in accordance with the present invention;

Figure 9 is a perspective view of a spring system for a four-wheel vehicle in accordance with the present invention;

Figure 10 is a perspective view of a modification of the spring system of Figure 9 with certain parts therein omitted which had been shown in Figure 9.

Figure 11 is a side view of an independent front wheel suspension indicating its mode of operation;

Figure 12 is an enlarged view of the suspension according to Figure 11 explaining the kinematics thereof;

Figure 13 shows a modified independent front wheel suspension for use with a spring system in accordance with the present invention;

Figure 14 is a showing of the kinematics of the independent wheel suspension of Figure 13;

Figure 15 is a partial side view of still another modification of an independent wheel suspension for use with a spring system in accordance with the present invention;

Figure 16 is a perspective view of a spring system for use with a motor vehicle having independently suspended front wheels;

Figure 17 is a perspective view similar to Figure 16 of a modification of a spring system for a motor vehicle in accordance with the present invention;

Figure 18 is a spring system for use with rolling equipment which operates on tracks;

Figure 19 is a modified spring system for a vehicle similar to Figure 18 for use with a railroad car, and Figure 20 is a still further modification of a spring system for a motor vehicle having independently suspended front wheels in accordance with the present invention.

In order to understand the theory of the present invention which aims at such a comprehensive and high goal, it is very essential to consider at first by means of some theoretical embodiments of a more fundamental nature the problems of spring systems as such before going into detail into the different actual constructions according to the present invention, which theoretical embodiments consider this question from a point of view which has been either altogether ignored or at least disregarded and neglected very much to the present. In order to avoid too extensive a complication of the expressions and language used, this analysis will be restricted to the domain of spring systems of double track motor vehicles.

It is basic and generally accepted that springs are used in vehicles to absorb or dampen shocks and vibrations or swinging movements.

In order to be able to fulfill the reason of their presence, namely to dampen shocks and vibrations, the springs at the vehicle frame as a rule must take into consideration and satisfy two main physical tasks, firstly, to carry the vehicle body and, secondly, to maintain the vehicle body as erect as possible or as parallel as possible to the street against the various unstabilizing influences which occur during the drive or during standstill about both horizontal axles.

In vehicle constructions of the prior art, it was always attempted to fulfill both of these tasks, at least essentially, by one and the same spring or springs. The builders of vehicles started with the notion that the springs had to be arranged and secured at the corners of the vehicle in order to directly absorb shocks and to achieve the greatest possible stability and steadiness. It was also believed best to provide for each wheel an individual spring which is located adjacent the same and is to be effective exclusively between the same and the part of the vehicle body directly thereabove. The spring tension or elasticity was then to be selected of such value that the spring possesses a sufficient capability for carrying the associated part of the vehicle, that all additional loads including those acting eccentrically and those caused by displacement of the center of gravity on an inclined road plane can be absorbed, and therebeyond that not only maximum forces due to shocks of the wheel are withstood, but also that the lateral inclination of the superstructure or body of the vehicle in curves, its rear movement during acceleration and forward tilting during braking be limited as much as possible. Furthermore, the same spring or springs were also intended to achieve at the same time that the vehicle is maintained erect during the drive, i.e., to provide sufficient forces for its restoration after displacement or rotation due to centrifugal forces necessary to bring it back into normal position although in view of the continuously changing load and of the natural motions or oscillations of these springs, of course, they are never capable to fulfill even only a portion of this long list of tasks in an appropriate manner.

The concept and manner of construction which had already come into existence at the time of the horse-and-buggy era has remained to date in the entire field of vehicle construction and remained without change even in today's modern, scientifically-minded motor vehicle construction in spite of its senselessness. The location of the springs and their tasks appeared once and for all to be finally determined, the improvement of the spring system was solely a matter of dimensioning, choice and selection of the type of individual springs, and as these were only considered individually or at best in their cooperation with the axles and guide arms, questions such as maximum softness, dampening characteristic and wheel guiding system were solved to some extent within the concept of the prior art spring systems, however, the fundamental physical construction of the vehicle chassis remained as good as unchanged. The concept of the tasks of the individual springs had become a dominating doctrine to such an extent that it was recognized almost as a safe concept of science, and as a result thereof new constructions were deemed satisfactory, even though not always willingly when a compromise of some sort between the necessary hardness and the desirable softness of the springs located at each corner of the vehicle could be arrived at as such compromise was considered by everyone as unavoidable.

It is known that the intensity of the vibrations or swinging movements, except as a result of the primary impact, which may be lessened, and of the mass moment of inertia of the vehicle body due to shifting movement thereof, is generated by the kinetic energy of the spring during the release or untensioning thereof. If this definition was satisfactory to the present motor vehicle technology then it is advisable to remind by the application of a little more exactitude that the aforementioned primary impact and the aforementioned energy passing through the latent condition relate to spring forces which simultaneously carry and maintain the vehicle body. For the question should be posed how it would be if the springs, which influence the angular position of vehicle body, did not have at the same time to carry its load, in other words, if these springs had not been preloaded or initially stressed by the load or weight of the vehicle body. In that case the permanent loads would have to be absorbed in a different manner, however, the springs which determine the angular position of the vehicle body could be made relatively much weaker, so that during the tensioning or stressing thereof only vastly smaller unstabilizing moments would be transmitted to the vehicle body and also during the release or untensioning thereof the forces released by the natural vibrations of the springs would remain within much more narrow limits.

It is a law well known in science but apparently less known in the technology that the energy passing through the latent condition of each spring is a function of its preloading or pre-tensioning. If one takes a spring of sufficient spring deflection and secures thereto a larger weight or load then, once struck by an impact, it will carry out numerous movements or vibrations with large amplitudes until it comes to rest again after consuming its energy by its own inherent frictional losses. If the same spring, however, is subjected to the same impact in an unloaded or untensioned condition, it will reassume its original position after a single movement which does not exceed the peak of the impact and after a retrograde movement which only slightly exceeds the original position and at the most will result in a brief vibration which does not produce any significant forces. This indicates that the natural or free vibrations or oscillations of a spring are determined to a large extent by the mass which is carried along by the spring. If the same is large in relation to the strength of the spring as is the case in a vehicle with springs which at the same time serve to carry and stabilize the vehicle, then depending on amplitude, accelerations and duration of vibration or swinging movements, such considerable movements must come into existence as are common today in vehicles, and at best an active counterforce such as a gyroscope would only be suitable to reduce the same. However, if the same is slight or non-existent at all, then the spring does what it is really intended to do and what many builders secretly expect from it: it produces while dampening or softening the primary impact a restoring force by means of which the position of the vehicle body is adapted to the new conditions and then remains with the slightest dampening in complete quiet or calm.

The recognition of the properties of such non-preloaded or untensioned spring offers the key for the creation of a new spring system in accordance with the present invention which promises almost ideal driving characteristics if it can be accomplished to stabilize the vehicle body by springs which only produce or release restoring forces. In connection therewith the question must be solved at first in what manner the vehicle body is to be carried if the springs are only to serve for purposes of stabilization. Undoubtedly this can only take place by means of springs if the possibility of a spring system is to exist at all; for only if the vehicle body is kept suspended at a certain height, a reduction of the hard forces is possible which emanate from the road. According to the deliberations in accordance with the present invention the stabilizing springs must be excluded as carrying elements and must be eliminated for that function.

However, one may ask, is it really imperatively essential that one and the same spring serves the dual function of carrying the vehicle body and at the same time of stabilizing the same, and is it not also possible to use in addition to the stabilizing springs a second set of springs for carrying purposes which are freed in their turn from the task of stabilizing the vehicle? This possibility undoubtedly must exist and that it actually exists is answered by the various constructional embodiments of the description of my present invention which follows hereinafter.

The invention consciously separates the two tasks ordinarily carried out by the springs of "maintaining" and "carrying" the vehicle body and seeks to fulfill the same by different springs or groups of springs. According to the present invention the task of "maintaining" the vehicle body erect is to take place by untensioned or non-preloaded springs or by only slightly preloaded springs while the function of "carrying" the vehicle body must necessarily take place by pretensioned or preloaded springs, which, however, are so arranged and constructed that they do not interfere with the task of maintaining the vehicle by the untensioned springs, i.e., that they do not transmit to the vehicle body any or only very slight forces which produce the angular vibrations or swinging movements of the vehicle which are to be eliminated.

In Figures 1 through 4, four different spring arrangements for vehicles with the associated spring diagrams thereof are schematically indicated. These schematic representations relate in the concrete case of the figures only to vehicles in which angular vibrations or swinging movements of the vehicle body are to be reduced about a transverse or cross axis. However, they may be considered as schematic arrangements in which a lessening of the angular swinging movements about the longitudinal axis are contemplated if the wheels are to be thought of as rotated by 90° about the vertical.

In the illustrated spring diagrams the ordinates indicate the spring deflection, while the abscissae indicate the spring tension of the spring. This is indicated analogous to actual springs as increasing from above to below. For reasons of simplicity springs with linear characteristic are indicated although others may be used; the inclined dot and dash lines are the characteristic curves thereof. The triangular diagrams resulting thereby are to be assumed to be supported with the bases thereof, indicated in cross hatchings, against the axles or wheels of the vehicle. The arrows $d$ indicate the direction of movement of the vehicle in all figures.

Thus Figures 1 to 4 indicate schematically an analysis of the spring forces in different embodiments of which Figure 1 is an analysis of the present-day construction, in which the individual springs are indicated in dotted lines. Figure 2 is a schematic diagram of a spring system obviating the disadvantages of that of Figure 1 by providing separate groups of springs in accordance with the concept of the present invention, the actual springs not being shown therein but being located in those places in which corresponding spring diagrams are indicated. Figures 3 and 4 are refinements and modifications in the concept of a spring system in accordance with the present invention which is based on the basic fundamental concept embodied in Figure 2. The various figures will now be described more fully in detail.

Figure 1 shows a schematic arrangement of a vehicle with a classic spring suspension as used by the prior art to date. Diagrams A—B—C and D—E—F represent the springs of the vehicle which at the same time fulfill the task of "carrying" and "stabilizing" the vehicle. These triangles are cut off by lines G—H and I—J which indicate the position of the vehicle body under static conditions. These lines projected on the abscissa indicate at the same time the pretensioning or preloading of the springs by the weight of the vehicle body. The lines A—G and D—I, however, correspond to the deflection or reduction in length of the spring caused by the aforementioned preloading. If vertical projections are taken from points H and J resulting in vertical lines H—K and J—L which intersect the diagram bases, then the rectangles G—B—K—H and I—E—L—J result which under all conditions of the load of the springs indicate the constant tension forces which are necessary for carrying the vehicle body, while the triangles H—K—C and J—L—F represent the reserve spring tensions of the springs for absorbing various temporary additional loads. The maximum additional static load, for example, by persons or goods are assumed to act at the point of the arrow $s$ halfway between the vehicle center and the rear axle. In that case the additional load on the front springs increases by a tension K—O which is equal to one-fourth the additional load, while the additional load on the rear springs increases by a tension of L—T which is equal to three-fourths of the additional load, whereupon only the triangles N—O—C and R—T—F of the two spring suspensions remain as reserve tension forces. If the vehicle which is loaded with a maximum of additional load is braked down with maximum deceleration, then tension B—O of the front spring increases as a result of the rotating moment resulting from the braking reaction by O—Q and the quadrangle N—O—Q—P is cut off from the triangle N—O—C representing the reserve tension force of the forward spring system. In the same quadrangle N—O—Q—P is also contained the additional load or tensioning of the front spring which takes place as a result of a change of the position of the vehicle body when driving downhill. As in this condition the ability of the front wheels to brake decreases so that full use of the spring tension N—O—Q—P may not be made for purposes of braking, a quadrangle representing the additional load on the front spring during downhill drive would more or less extend into the quadrangle N—O—Q—P without crossing the line P—Q toward the right to any extent. Thus, in order to avoid a complicated mode of illustration it was deemed advisable not to draw in separately the quadrangle for the additional tension of the front spring during downhill drive but solely to point out to a greater or lesser identity thereof with the quadrangle N—O—Q—P.

The diagram for the rear spring was simplified in a similar manner in that the quadrangle R—T—V—U may serve for purposes of simultaneously indicating the spring tensions of the rear springs exceeding the permanent additional load during acceleration and up-hill drive. The triangles P—Q—C and U—V—F then represent the remainders of the reserve tension forces of the front and rear springs which must exist for absorbing shocks as well as bring about a return of the vehicle body to its normal position in order to prevent any impact of the vehicle body on the axles. The center of gravity of the vehicle is designated by S while the moment center which lies at about the height of the roadbed is designated by M.

The same forces representing the "carrying" and "restoring" forces which are present in Figure 1 may be reconstructed in a different manner as shown in Figure 2. The springs A—B—C and D—E—F of Figure 1 are thereby moved as springs A'—B'—C' and D'—E'—F', as shown in the drawing, substantially under the center of the vehicle body and are freed by a common bearing M' formed as a common balancing lever from transmitting to the vehicle body forces rotating about the cross axis so that in the plane of the diagram these springs are to carry out solely more of a "carrying" or supporting function. In order to dispose of sufficient angularly effective spring tension forces to absorb the front or rear loads, the braking or accelerating reactions and the moments of the nodding vibrations or swinging movements, and in order to return the vehicle body after rotation about the cross axis, the triangles H—K—C and J—L—F of Figure 1 representing a certain spring tension produced by springs (not shown) were left as h—k—c and j—l—f in Figure 2 at the same place as shown in Figure 1, and are now indicated therein as individual springs which are freed from the task of "carrying" the vehicle body. Since the rates of elasticity or modulus of the stabilizing springs have remained the same as in Figure 1, statically nothing has changed in Figure 2 insofar as the forces about a cross axis are concerned. However, dynamically and vibrationwise considerable differences result, namely that the nodding vibrations or swinging movements are no longer determined by springs simultaneously carrying and maintaining the vehicle body which are prestressed or preloaded, but by non-preloaded or untensioned springs which are essentially free of forces producing natural oscillations. Thus Figure 2 represents the principle of the present invention in its first approximation.

However, further improvements and refinements are possible. Figure 2 came into existence in that the spring diagrams of Figure 1 or parts thereof were taken over in Figure 2 as were necessary according to the magnitude of abscissae and ordinates for a vehicle of present-day construction. A brief reflection will show that it is appropriate to make various changes in the spring diagrams when using the principle in accordance with the present invention. Firstly, since the "carrying" spring which carries the load is now effective essentially under the center of gravity of the vehicle body, an equally large spring deflection as in Figure 1 is no longer necessary as the vertical movements of the vehicle body are much smaller at the new location thereof.

In Figure 3 which illustrates the improvements over the vehicle of Figure 2, the distances G'—B' and I'—E' of Figure 2 are reduced to G"—X and I"—N'.

Secondly, the rate of elasticity or modulus of the "carrying" springs may be reduced as vertical translatory movements of the vehicle body now also encounter the resistance of the "stabilizing" springs as represented by the triangles h—k—c and j—l—f of Figure 2. From a point of view of limiting these vertical movements the triangles H'—K'—C' and J'—L'—F' were not necessary as similar restoring forces as in Figure 1 are already present in the triangles h—k—c and j—l—f. The triangles H'—K'—C' and J'—L'—F' were shown in Figure 2 only because springs, the spring tension of which does not increase with increased spring deflection, cannot be manufactured and because the springs of Figure 1 were at first to be taken over without any changes. However, since the "stabilizing" springs located at the ends of the vehicle offer already a considerable reserve tension force against the movements of the vehicle, namely against "pitching" thereof, the triangles A'—B'—C' and D'—E'—F' of Figure 2 which show broad bases could be replaced in Figure 3 by triangles W—X—Y and Z—N'—O' with smaller bases, which means in actuality springs having lesser rates of elasticity or spring moduli.

Thirdly, changes in the rates of elasticity or moduli of the stabilizing springs were advisable as the additional loads which may occur in a vehicle constructed according to the new principles distribute themselves differently over the springs of such vehicle than over the springs of a vehicle of the prior art construction. In a vehicle construction according to Figure 1, the additional load distributes itself, if it acts intermediate the two axles, on the front and rear springs. In a vehicle built in accordance with the present invention and in accordance with the new principle, the additional load is absorbed, in addition to being absorbed by the "stabilizing" springs which are located at the ends of the vehicle, also by the "carrying" or supporting springs which are located in the vehicle center. If the additional load, as was assumed in connection with all Figures 1 to 4 acts, corresponding to the arrows s, halfway between the vehicle center and the rear axle, then in a vehicle according to the old construction three-fourths of the additional load falls on the rear spring and one-fourth thereof on the front spring. In a vehicle according to the new system, approximately half of the additional load is carried by the rear stabilizing spring while approximately one-fourth each by each of the two supporting or "carrying" springs in the center while the front stabilizing spring, depending on the ratio of the rate of elasticity of the rear stabilizing spring to that of the two carrying springs, undergoes for the most part a slight loading or unloading, i.e., tensioning or untensioning, whereby the spring forces of all the springs are brought into equilibrium. This difference in load effective at the front stabilizing spring is quite slight, at least with the assumed point through which the additional load s acts, and, therefore, could also be neglected in the diagrams. Important, however, for purposes of further consideration is the extent by which the elastic rates or moduli of the stabilizing springs may be reduced by the new distribution of the additional load. Insofar as the front stabilizing spring is concerned the distance K—O of the front spring diagram of Figure 1 could be deducted from the distance k—c of the front stabilizing spring of Figure 2 so that in Figure 3 the base k'—a resulted which is indicative of the maximum tensioning force of the front stabilizing spring. The diagram of the rear stabilizing spring in Figure 3, however, resulted in that half of the abscissa value of the additional load equal to two-thirds the distance L—T of Figure 1 was plotted as l'—n to which were were then added the distance T—V and V—F from Figure 1 as new distances n—p and p—b respectively. The possible reduction of the elastic rates or moduli of the stabilizing springs, as a comparison of the diagram of Figures 1 and 2 will illustrate, is not yet significant in Figure 3. However, by reference to Figure 4 it will be shown that in the new construction according to the present invention it may be quite considerable.

The spring diagrams of Figures 2 and 3 came into existence under the assumption that the moment center for the forces effective about the cross axis lies approximately at the height of the road surface as corresponds also to the old system according to Figure 1. Such construction resulted in long lever arms, drawn in dotted lines, between the center of gravity S of Figure 1, S' of Figure 2 and S" of Figure 3 and the moment center M of Figure 1, M' of Figure 2 and M" of Figure 3. The forces due to the braking reaction, the acceleration reaction and the forces caused by displacement of the weight during driving up or down a hill acted in the longitudinal vertical plane of the forces by means of these long lever arms and in selecting the moduli or elastic rates of the springs it was necessary to take these forces into consideration by the base sections O—Q and T—V of Figure 1 or k'—g and n—p of Figure 3. If the moment center, such as M''' of Figure 4, is displaced so as to be at a height of the center of gravity S''' as shown in Figure 4, then the long lever arm is eliminated and the stabilizing springs remain free from those forces. Accordingly, the bases of the diagrams thereof may be reduced by the aforementioned sections O—Q and T—V or k'—g and n—p and the only remaining values, as will be seen from an inspection of Figure 3, are g—a for the front spring and l'—n plus p—b for the rear spring.

In Figure 4 these bases, however, were further reduced a little as a vehicle body, the center of gravity of which coincides with the moment center, swings less than another and, therefore, requires for restoration thereof into normal position lesser forces. The distances k''—g and l''—r therefore represent the very short bases of the spring diagrams of stabilizing springs of a vehicle in which the principle of the distribution of the spring tasks into two different spring groups is combined with the use of a high moment center. These short bases in effect could only be realized because in the diagrams R'—T'—U' and V'—W'—X' of the carrying springs the reserve tension forces H'''—Y'—U' and J'''—Z'—X' are still present which bring the resistance of the stabilizing springs, which offer only a slight resistance against vertical linear swinging movements of the vehicle body, up to a sufficient degree. The fact that this type of vehicle, in spite of the relatively weak stabilizing springs, need not be more sensitive against peripheral additional loads than others becomes clear by the fact that the vertical distance i' in Figure 4 which represents the extent of lowering of the rear end of the vehicle under the most unfavorable conditions is not larger than the corresponding extent i of Figure 1. This favorable relationship between resiliency of the springs located at the vehicle ends and the resistance against peripheral additional load is based on the explained physical characteristic of the new construction.

As may be clearly seen from Figure 4 the primary forces of the springs which cause the nodding movement of the vehicle body is reduced with respect to the known construction to a decisive extent while the springs are nevertheless capable to fulfill all static tasks.

Returning once more briefly to the dynamic conditions which exist in the new vehicle according to my invention and in connection with Figures 1 to 4, the following may be said:

The abscissa shown in dotted lines, namely 1—2, 3—4, 5—6, and 7—8 in Figure 1, 9—10, 11—12, 13—14 and 15—16 in Figure 2, 17—18, 19—20, 21—22, 23—24, in Figure 3, and 25—26, 27—28, 29—30 and 31—32 of Figure 4 enable a comparison of all four embodiments of the forces caused by the natural or free oscillations of those springs which forces in turn determine the nodding vibrations or swinging movements of a vehicle; for the forces caused by natural oscillations are proportional to the loads of the springs as may be read directly on the abscissae. These abscissae show that also the secondary forces which produce swinging or vibratory movements are reduced in the new vehicle according to my invention in an appropriate and satisfactory manner, and therefore a driving quiet which has been significantly perfected and improved may be expected for two reasons, namely because of the considerably reduced "static" strength of the stabilizing springs and because of the elimination of dynamic forces which may be termed as almost complete. Since according to Newton's law:

$$a = \frac{F}{m}$$

where $a$=acceleration, $F$=force and $m$=mass, and since the mass $m$ has remained the same, a considerable reduction of the acceleration must result and therewith the swinging movements which still exist will not only proceed in a much more soft manner but also because of the lesser force exerted by the springs they will show smaller amplitudes.

The actual technical realization of my new spring suspension incorporating the new concepts developed in passing from Figures 1 to 4 will now be described by reference to the further Figures 5 through 20 which show various modifications in accordance with the present invention.

In the description to follow hereinafter, the term "carrying" springs is used to designate those springs whose function it is to carry or support the weight of the vehicle body and the passenger and/or payload, whereas the term "stabilizing" springs is used to designate those springs, usually relieved of any pretensioning or prestressing, whose function it is to stabilize the vehicle body against angular vibrations or swinging movements about one or more axes, as will be produced, for example, by the forces caused by the braking or acceleration reactions and the centrifugal forces.

In the search for a practical solution of a spring system shown and analyzed in connection with the diagrammatic showing of Figure 4, a construction according to Figure 5 suggests itself which appears to come closest in construction and mode of operation to that of Figure 4. In the modification of Figure 5 the frame 103 of the vehicle body is pivotally secured in the center thereof by two bearings 104 about a cross axis on a supporting member 105 to which are secured in any suitable manner semi-elliptical springs 106 extending over the entire wheel base of the vehicle, which together with the guide members 107 and 108 support the axles 109 and 110. The guide members 107 and 108 also act on the supporting member 105 to which they are secured, for example, articulately in any suitable manner. The leaf springs 106 constitute the "carrying" springs for purposes of "carrying" or supporting the vehicle body and for purposes of stabilizing the same about the longitudinal axis, while helical springs 111 and 112 arranged at the vehicle ends serve to support the system about a cross axis.

It may well be assumed that a construction of a vehicle according to Figure 5 does not meet with general approval; for the frame thereof is stressed in a very unfavorable manner so as to result in a considerable additional weight. Furthermore, the supporting member 105 considerably increases the cost in a very undesirable manner. Moreover, all forces must be transmitted by means of the bearings 104 in the vehicle center which, therefore, must be constructed very ruggedly. This will result, however, in difficulties as these bearings either reduce the available space in the vehicle body or the desired relatively high moment center cannot be realized. Thus, all in all the construction according to Figure 5 is not one which is of great practical possibilities. However, it is of considerable importance in showing the first realization of a spring suspension in accordance with the present invention and in pointing the way to improvements as illustrated in other modifications to be described hereinafter.

The embodiment of Figure 5 exhibits the many technical disadvantages because its conception rests on the cardinal error to attempt to support the vehicle body only in two central bearings 104. In the interest of keeping the weight of the frame down and in the interest of eliminating the supporting member 105, it is desirable to provide a suspension in more than two points which may also be distributed better over the vehicle body. This, however, appears in direct contradiction to the maxim of the present invention which for purposes of eliminating the rotating forces of the "carrying" springs requires exactly a central two-point suspension.

In order to be accurate this condition or prerequisite must be restricted to the extent that the two-point suspension need only be of physical nature. It is quite possible, as will be shown hereinafter, to render the "carrying" springs by the use of an imaginary joint rotatable about a central axis while the actual material suspension of the vehicle body may then take place in many peripheral joints.

Figure 6 shows an embodiment with a peripheral suspension about an "ideal" joint of which, however, individual elements may already be known, per se.

The frame 203 supports itself on each side on two angle levers 205 and 206 which are connected by a pull or draw rod 204. The angle levers 205 and 206 are secured to the frame 203 in any suitable manner, as by means of pivot pins, closely at the points where they act on the axles 209 and 210. The angle levers 205 and 206 transmit the weight or load to the axles 209 and 210 by means of helical springs 207 and 208. Two further helical springs 211 and 212 which are interposed between the angle levers 205 and 206 and the frame 203 keep the vehicle body erect about a cross axis with respect to tilting moments.

Figure 6 shows a construction which in a deceptively similar manner had already been used in cross country type vehicles. Such vehicles also possess the mentioned equalizing elements. However, since with such vehicles the aim consisted only in eliminating the torsional stresses of the vehicle body and in increasing the adaptability of the vehicle wheels to the terrain unevenness to a considerable extent, those in charge of the construction of such vehicles believed to be able to content themselves with a much lesser movability and suspended again the complete degree of freedom achieved by the balance type suspension before it could be put to use at all. For in those vehicles the vehicle body is not rotatable as a whole with respect to the axles but the equalizing elements permit only rotations on each side by themselves which, as a result of a coupling, however, must proceed in an opposite manner to those of the other side. It was thereby to achieve that a single set of springs was sufficient to carry the vehicle body and also to maintain it erect. However, this is exactly what the present invention does not wish to accomplish; for only if the static and dynamic forces of the springs are approximately completely decoupled or neutralized with respect to the vehicle body, i.e., on both sides thereof, so that they cannot be transmitted to the vehicle body as rotational moments, the nodding vibrations or swinging movements of the vehicle body may be reduced in a manner unattainable heretofore.

Figure 6 was primarily intended to demonstate the substitution of the material central suspension by an ideal or imaginary one. Consequently, for reasons of clarity, the wheel guiding elements were not shown in that figure. If it is assumed that the wheels, as in most vehicles and as also in the aforementioned countryside type vehicles, are guided vertically as seen in the side view, then a moment center would result for the forces effective about the cross axis which as in Figure 3 lies approximately at the height of the road surface. In that case, if the stabilizing springs are assumed to be removed, the tendency to tip over about the cross axis would be very pronounced and, consequently, the stabilizing springs would have to be formed very strong corresponding to the diagrams of Figure 3. With the assumption of a normal low-lying moment center the arrangement according to Figure 6 therefore cannot completely replace that of Figure 5. The central "imaginary" joint is realized for the rotating forces of the "carrying" springs, however, not for those other forces effective about a cross axis which must be taken into consideration in a vehicle spring system.

Figure 7 illustrates also in a schematic manner how the wheel guiding elements must be arranged in order to absorb these other forces such as braking reaction, acceleration reaction, etc. with a moment center which lies at the height of the center of gravity $S_3$. The frame is designated by reference numeral 303. The axle 309 and 310 which are positively connected with brake plates and the axle differential are supported by arms 316 and 317 directed toward the center of the vehicle which in principle are horizontal and which extend up to the joint hinges or points 318 and 319 which lie in the connecting lines 320—$S_3$ and 321—$S_3$ between the points of contact of the wheels 320 and 321 and the center of gravity $S_3$. During braking, for example, two components 322 and 323 result in the joint 318 and two components 324 and 325 in the joint 319 and the resultant vectors 326 and 327, which are found by vector addition, then coincide with the connecting lines 320—$S_3$ and 321—$S_3$ so that the forces represented by the resultant vectors 326 and 327 lead in a straight line to the center of gravity $S_3$ or away therefrom and, therefore, cannot rotate the vehicle body about the cross axis. During acceleration obviously opposite force parallelograms are produced. However, in this case also the rotational moment effective about the cross axis is balanced by the arrangement.

If both systems of Figures 6 and 7 are combined, then a modified construction illustrated in Figure 8 results therefrom in which the rotating forces of the "carrying" springs, the braking and accelerating reactions as well as all possible rotating moments effective about the cross axis are balanced.

The vehicle frame 403 rests on both sides on the angle levers 405 and 406 connected by draw rods 404 which transmit the weight of the vehicle body by means of helical springs 407 and 408 to the axles 409 and 410. Struts or stay rods 416 and 417 lead away from the axles 409 and 410 to the joints 418 and 419 which lie in the connecting lines 420—$S_4$ and 421—$S_4$ between the points of contact of the wheels 420 and 421 and the center of gravity $S_4$. The axles 409 and 410 are guided laterally by transversely extending rods 431 and 432 which are secured by ball joints. Helical springs 411 and 412 effect a fine restoration into the horizontal position which does not produce any more any significant rotating moments.

The arrangement according to Figure 8 represents physically a complete equivalent of that according to Figure 5 without, however, involving the technical disadvantages of the latter. Thus a first practically acceptable embodiment is shown in Figure 8 for the new spring suspension in accordance with the present invention which had been discussed more or less theoretically in connection with the preceding figures.

Further modifications will be discussed hereinafter which exhibit further important particularities as compared with Figure 8.

Figure 8 was shown as being provided forwardly and rearwardly with rigid axles. However since in passenger motor vehicles of today, at least with the front wheels, only independent spring suspension are used, Figure 9 shows a modification which has such a spring suspension at the front end thereof while using otherwise the elements shown in Figure 8.

The vehicle frame 503 supports itself, as also in Figure 8 by means of four angle levers 505, 505', 506 and 506' which are connected pair-wise by means of the two draw rods 504 and 504' extending from the front to the rear. While the rear angle levers 506 and 506' transmit the pressure to the rear axle 510 by means of short intermediate pieces 541 and 541' spherically articulated at the top and bottom thereof, the horizontal arms of the front angle levers 505 and 505' abut against helical springs 507 and 507' spherically articulated at the top thereof which transmit the pressure to the lower cross guide members 542 and 542' which in turn are articulately journalled, as by means of spherical joints, at the vehicle frame 503 and at wheel carriers 543 and 543'. The two wheel carriers 543 and 543' are at the top thereof connected with the vehicle frame 503 by means of spherically articulated upper cross guide members 544 and 544' and extend rearwardly in the form of struts or stays 516 and 516' where they are fastened by means of ball joints 518 and 518' at the vehicle frame 503 in the plane passing through the center of gravity and the two points of contact of the front wheels. The rear axle is retained in the longitudinal direction by a triangularly shaped brace 551 which is secured to the frame by ball joint 552 which lies in the plane passing through the center of gravity and the two points of contact of the two rear wheels. The rear axle is guided laterally, by means of a cross rod 553 which is spherically articulated at both ends thereof in addition to the guiding action which is obtained by the joint 552. The helical springs 508 and 508' which are responsive to and stressed by pressure and which are inserted in the draw rods 504 and 504' behind the centers thereof serve as "carrying" springs while the helical springs 511, 511', 512 and 512' which are actuated by the draw rods 504 and 504' by means of disks or plates and which abut against the frame cross members take over the task of stabilization about a cross axis. In order to transmit only the slightest possible forces to the vehicle body in the center position thereof the action of the stabilizing springs 511, 512, 511' and 512' is superimposed onto that of the carrying springs 508 and 508' respectively.

The vehicle according to Figure 9 may well satisfy all needs of today. However, if this embodiment is to be viewed with criticality, then in the first place should be mentioned the additional cost due to the many angle levers and the numerous joints. Furthermore, it may be feared that upon completely unloading the wheels, as may take place for example, when lifting up one side by a jack or during loading of the vehicle by means of a crane the draw rods may be bent or jammed. Consequently, they must be formed very strong and must possibly also be able to absorb compression. This is not exactly desirable by reasons of the desirability of keeping down the weight of the moving mass of the vehicle as well as also by reason of the vehicle weight as such.

If, however, strong rods are to be used anyhow for purposes of connecting the front and rear springs why should one not form the same as torsion rods?

Figure 10 shows an embodiment similar to Figure 9 in which only those parts differing from Figure 9 are shown and in which torsion rods are used as "carrying" or supporting springs which at the same time bring about the force equalization between the front and rear axle. This particular construction avoids in the most simple and practical manner all the disadvantages of the embodiment according to Figure 9. The torsion rods 604 and 604' to be thought of journalled at the vehicle frame (not shown) serve simultaneously as front and rear "carrying" springs, they extend from the front to the rear axle without fixation and carry at their ends horizontal levers which point, however, in different directions. The front levers 642 and 642' serve simultaneously as lower guide arms of the independent front wheel suspension and are, therefore, directed outwardly, while the rear levers 654 and 654' are directed inwardly and are effective on the rear axle 610 by means of short draw elements 641 and 641' which are spherically articulated at the bottom and top thereof. The front wheel suspension is completed by the upper guide arms 644 and 644' provided with ball joints on both ends thereof, as well as by means of the wheel carriers 643 and 643' which are provided with struts 616 and 616' as explained in connection with Figure 9, whereas the rear axle is again guided by means of a triangularly shaped brace 651 secured to the frame by means of a ball joint 652 and a rod 653. The torsion rods 604 and 604' also assume the task of stabilization about the longitudinal axis. In order to provide a stabilization about a cross axis rubber bearings 655 and 655' are provided in the center of these rods which are responsive to rotation and may be secured to the frame in any suitable manner.

The construction according to Figure 10 is quite simple and clear. At best only the arms 616 and 616' leading rearwardly from the wheel carriers 643 and 643' may be criticized which are bent in a shape which is rather unfavorable for the transmission of the braking reaction and which are heavy by reason of their length so that they increase the mass which is not spring suspended. Their elimination would undoubtedly be desirable.

According to the present invention in order to avoid these disadvantages a combination of two short arms are to be substituted on each side for the one individual long arm to absorb the braking reaction which two arms, of course, cannot act on the frame in a single real pivot point but which enable movement of the wheel carrier about the same geometric point, whereby the double-type guide arms ordinarily used nowadays in independent front wheel suspension are to be used as these short arms. This principle may be realized with transversely as well as with longitudinally extending guide arms.

Figure 11 shows an arrangement with longitudinal guide arms of the so-called double crank type. These arms are journalled in the vehicle frame ahead of the front axle one above the other and swing about transversely extending horizontal axes. However, the arms 701 and 702 thereof, as viewed from a side view, do not extend rearwardly in parallel but they approach each other at the wheel carrier in such a manner that their lines of continuation in the center position of the suspension intersect at a point $M_2$ in the side view of the vehicle which lies in or close to the connecting line between the point of contact of the wheel 703 and the center of gravity $S_7$ of the vehicle body.

The mode of operation of the arrangement of Figure 11 becomes obvious from Figure 12 which has as its object an illustration of the kinematics of the guide combination. Regardless in which position the two crank arms 701 and 702 are, whether they are directed upwardly or downwardly, the triangle 704—705—$M_2$ if it is reconstructed along the rotated base 704—705, for example, as triangle 704'—705'—$M_2'$, indicated in dash lines, or as triangle 704''—705''—$M_2'$, indicated in dot and dash lines, it will always point with its apex almost exactly to the original point $M_2$ and as it almost exactly rotates thereabout, except for a minimum horizontal deviation of the apex to $M_2'$, it acts almost exactly like an individual long braking-reaction arm and may therefore also be considered as the mechanical and kinematic equivalent thereof. Thus the ideal point $M_2$ is in effect a moment center for the movement of the wheel carrier with respect to the vehicle body, a so-called secondary moment center valid only for the front axle, and as the braking reaction consequently extends in the direction 703—$M_2$ directly toward the vehicle center of gravity it will be absorbed for all practical purposes without producing any rotating moments at the vehicle body. The slight deviation of the moment center from $M_2$ to $M_2'$ is thereby practically without significance as the continuation of the line 703—$M_2$ at the most may deviate thereby a few centimeters from the center of gravity of the vehicle body. As this deviation takes place by reason of swinging movements of the wheels and thereby rapidly changes between plus and minus values, only such rotating forces come into existence which may be readily neutralized by the large mass inertia of the vehicle body. Thus an equalization of the braking reaction may be expected which is as good as absolute.

Figure 13 shows a corresponding arrangement with guide arms which swing in the cross direction. In this embodiment the axes of support of the guide arms at the frame (not shown), namely axis 714 in connection with the upper guide arm 711 and axis 715 in connection with the lower guide arm 712 are such that the continuation of the axes thereof intersect at or near the connecting line between the point of contact 713 of the wheel and the center of gravity $M_3$ of the vehicle. The wheel carrier 716 is articulated at both ends thereof by resilient joints 717 and 718, such as, for example, rubber joints, in order to absorb the stresses and rotations which result during swinging movement of the guide arms. However, for purposes of connection with the wheel carrier 716 ball joints may also be used.

Figure 14 shows the kinematics of the arrangement described in Figure 13. The triangle 719—720—$M_3$ moves upwardly or downwardly depending on the movement of the guide arms and transforms itself into the triangle 719′—720′—$M_3′$, shown in dotted lines, or into triangle 719″—720″—$M_3′$, shown in dot and dash lines, the apexes of which coincide closely with the original point $M_3$. Consequently, there cannot be any doubt that the effect of the arrangement is similar as that of Figure 11 and, therefore, the long brake-reaction arms may also be avoided by the use of transversely extending guide arms.

For completeness of the present disclosure it should also be mentioned at this point that a third possibility for suspending the front wheel is possible which enables elimination of the long brake-reaction struts or arms.

It consists as shown in Figure 15 of the use of a sliding element, the sliding guide member 721 of which, however, is bent and formed of quadrangular cross section thereby having four edges and at the slide member 722 of which the steering pivot bearing 723 is separately arranged. If the curvature of the sliding path corresponds to the arc of a circle, the center of which lies at a point of the line leading from the point of contact of the wheel to the center of gravity, then in this particular arrangement no displacement of the ideal point of rotation takes place and the kinematic arrangement thereof is thereby geometrically equivalent in an exact manner to that of the long braking-reaction arm.

The arrangement described above which provides the ideal secondary points of rotation of the wheel guiding elements may also be used, of course, appropriately changed, for the simplification of the wheel guiding arrangement of the rear wheels which will be described by a reference to Figures 16 and 17 illustrating a complete wheel suspension.

Figure 16 illustrates an arrangement with front guide arms of the longitudinal type which are connected with a rear rigid axle by means of two torsional springs serving the purpose of carrying the vehicle and stabilizing the same about a longitudinal axis. The four front crank guide arms 801, 802, 803 and 804 correspond to those described in Figure 11 and the extension of the axes of arms 801 and 802 as well as those of arms 803 and 804 intersect in points $M_4$ and $M_4′$ which lie in a plane passing through the point of contact of the wheels and the center of gravity of the vehicle. The cranks of the upper guide arms 801 and 803 are provided at their inner ends with horizontal levers 805 and 806 directed rearwardly on which are mounted by means of ball-type joints short vertical draw members 807 and 808 which are adjustable in the longitudinal direction. The draw members 807 and 808 are connected at the lower ends thereof by similar ball-type joints with transversely arranged horizontal levers 809 and 810 which are connected for common rotation with the main torsional springs 813 and 814 by means of splined sleeves 811 and 812 which are journalled at the vehicle frame (not shown). The torsion springs 813 and 814 are secured in the center thereof against bending by means of bearings 815 and 816 and terminate ahead of the rear axle in splined sleeves 817 and 818 journalled in the vehicle frame which carry lever arms 819 and 820 directed outwardly and connected with the torsion rods 813 and 814 for common rotation by the splined connections. Ball joints at the outer ends of lever arms 819 and 820 secure the rigid rear axle 821 by means of rigid shackles 822 and 823 movable in a transverse direction, in two low-lying points. The rear axle 821 is retained in the upper part thereof by a longitudinally arranged guide element 824 which is slightly inclined toward the front so that by the movement thereof as well as by that of the lower guide points a moment center for the rear axle is produced which lies in a plane which coincides with a plane passing through points of contact of the rear wheels and the center of gravity of the vehicle body. The rear axle 821 is guided in the lateral direction by a Z-shaped element which consists of a balancing lever arm 825 movable about the pinion housing of the differential and of two guide members 826 and 827 which connected the lever arm 825 with the frame at which the members 826 and 827 are supported by rubber joints, of which the lower guide member 827 is formed as a lever arm which is actuated by a non-preloaded or untensioned longitudinal torsion spring 828 which serves for purposes of stabilization about the cross axis. No special stabilizing spring is provided at the front suspension as numerous joints exist thereat which may be constructed as resilient joints by means of rubber blocks and thereby produce a sufficient restoring force.

In contradistinction to the aforementioned construction of Figure 16, in the embodiment according to Figure 17, transversely triangularly shaped guide arms 901, 902, 903 and 904 are provided which are analogous to Figure 13 form a moment center for absorbing the braking moments which lies in the axis $M_5$—$M_5′$ which in its turn lies in the plane passing through the points of contact of the front wheels with the road and the center of gravity of the vehicle body. The two lower guide arms 902 and 904 pivot freely at the vehicle frame (not shown) while the upper guide arms 901 and 903 are provided additionally with somewhat lower lugs to which are connected draw members 907 and 908 inclined inwardly downwardly therefrom and which are secured thereto by resilient joints such as rubber blocks or rings. The members 907 and 908 are connected with levers 909 and 910 which are inclined inwardly and upwardly and which are provided with splined sleeves 911 and 912 journalled at the vehicle frame. The main torsion springs 913 and 914 engage the splined sleeves 911 and 912 at the front end thereof to thereby secure the springs 913 and 914 to the levers 909 and 910 for common rotation therewith. The main torsion springs 913 and 914 serve to carry the vehicle body and to stabilize the same about a longitudinal axis. The main torsion springs 913 and 914 are again secured in the center thereof by bearings 915 and 916 against bending, and terminate, as in Figure 16, in splined sleeves 917 and 918 which are journalled at the vehicle frame and provided with levers 919 and 920 directed outwardly, the ball joints of which fix the rear axle 921 over shackles 922 and 923, movable in the cross direction, at the lower side thereof in the longitudinal direction of the vehicle. The upper side of the rear axle is secured by a triangularly shaped guide element 924 which is rotatably journalled at the vehicle frame about a cross axis and which absorbs the lateral forces of the rear axle as well as the longitudinally directed forces which are produced by the upper part of the rear axle 921. This triangular guide element 924, similar to the guide element 824 in Figure 16, is slightly inclined forwardly so that by its position as well as by that of the lower fixing points of the rear axle a center of moment results which lies approximately in the plane passing through the points of contacts of the rear wheels and the center of gravity of the vehicle body. A longitudinal untensioned torsion rod 928 serves for purposes of stabilization about a cross axis which is coupled to the apex of the triangularly shaped guide element 924 by means of a lever 927 and a draw element 925. The resilient type of bearings such as rubber block or rubber ring type bearings which are used throughout also provide for the front wheel suspension sufficient restoring forces about a cross axis.

While the embodiments so far described relate only to motor vehicles in which the angular vibrations or swinging movements were to be reduced about a cross axis, two modified embodiments will be described in Figures 18 and 19 in which a reduction of the angular swinging movements about a longitudinal axis is aimed at. As these swinging movements appear in a particularly annoying manner in railroad cars, these two embodiments are described in connection with such types of vehicles.

Figure 18 shows a railroad axle or wheel set 1001 provided with the necessary springs for carrying the vehicle body and to stabilize the same about a longitudinal axis. These consist of two torsion tubes 1003 and 1004 which are journalled at the vehicle body or truck frame in the journals 1005, 1006, 1007, 1008, 1009, 1010, 1011 and 1012 and which act on the axle boxes by means of levers 1013 and 1014, and of torsion rods 1015 and 1016 which lie within the torsion tubes 1003 and 1004 and within the area of the levers 1013 and 1014 are connected therewith by a spline connection. The free ends of the two torsion rods 1015 and 1016 are secured at the vehicle body or truck (not shown) by a spline arrangement 1017 and 1018 whereas the ends of the torsion tubes 1003 and 1004 are provided with vertical levers 1019 and 1020 which are coupled with each other by a draw rod 1021. From the description it follows that the two torsion tubes 1003 and 1004 with the levers 1013 and 1014 thereof and the draw rod 1021 form a spring differential system which is adapted to support the vehicle body in an ideal longitudinal axis whereas the torsion rods if they are built-in without preloading or prestress may exert restoring forces about the longitudinal axis without transmitting any large forces due to natural oscillations.

In the arrangement according to Figure 19 the same principle is used with the difference that the moment center for the forces about the longitudinal axis coincides with the center of gravity $S_{11}$ of the vehicle body. The axle 1101 with the journal boxes is guided in slideways 1103 and 1104 which are provided at the truck frame 1102. The carrying springs 1105 and 1106 act on the axle journals by means of shackles 1107 and 1108 and by means of levers 1109 and 1110. The ends of springs 1105 and 1106 are secured in the truck frame. The vehicle body 1120 rests by means of rollers 1111 and 1112 on the curved guide paths 1113 and 1114 provided in the truck which are curved according to circular arcs the radii of which intersect in the center of gravity $S_{11}$ of the vehicle body. For purposes of stabilization about the longitudinal axis a non-preloaded or unstressed torsion spring 1115 is provided which is fixed and journalled in the vehicle body, the movable end of which transmits over a lever 1116 and a shackle 1117 restoring forces to the truck frame which are essentially devoid of natural or free oscillations.

A final embodiment is now to be described by reference to Figure 20 which illustrates a motor vehicle frame in which according to the various principles of the present invention the angular vibrations or swinging movements about a cross as well as longitudinal axis are to be kept within as narrow limits as possible.

In this embodiment, analogous to that of Figure 16, double crank guide arms 1201, 1202, 1203 and 1204 are used for the front wheel suspension which swing in longitudinal planes, however, with the variation that the inner levers 1230 and 1231 of the upper guide arms 1201 and 1203 are provided on the right and left thereof with ball joints for purposes of securing thereto drawing elements. Of these draw elements, those designated by reference numerals 1232 and 1233 are connected at the bottom thereof with the balancing arm 1234 which in its center point is coupled with a lever 1235 which pivots about a pin which is slightly displaced from the vehicle center and journalled in the vehicle frame and which points rearwardly at a slight incline. A strong torsion spring 1236 is engagingly connected with this pin by means of a spline-groove connection which torsion spring 1236 extends diagonally across the vehicle over almost the entire length thereof like the inclined leg of the letter Z up to a point on the other side of the vehicle ahead of the rear axle where it is connected by means of a splined connection with the hollow pin of a lever 1237 which is directed in the opposite direction from that of lever 1235, the hollow pin 1237' being journalled at the vehicle frame (not shown). The end of the lever 1237 lies in the longitudinal plane of symmetry of the vehicle and is connected with the lower end of a balancing lever 1238 by means of a rubber joint which balancing lever 1238 surrounds with the large center bearing thereof the bevel gear housing of the rear axle 1239 and which is connected at the top thereof by means of a universal joint with a guide arm 1240 pointing in the other direction of the vehicle, the outer end of which is secured to the vehicle body in any suitable manner, as by means of a ball joint 1240'. The balancing lever 1238 together with the two lever arms 1237 and 1240 guides the rear axle 1239 in the lateral direction whereas the triangular brace-like suspension 1241 guides the rear axle in the longitudinal direction, the point of the articulate connection 1241' of the brace-like member 1241 at the vehicle frame lying in a plane passing through the points of contacts of the rear wheels with the road and the center of gravity of the vehicle body. Two shackles 1242 and 1243 are connected by means of rubber joints with the outer ends of the rear axle 1239 which are connected with levers 1244 and 1245 extending transversely and journalled at the vehicle frame in the longitudinal direction by sleeves or pins 1244' and 1245'. The hollow pins of these levers 1244 and 1245 again are provided with a spline arrangement by means of which they are connected with the two non-preloaded or unstressed torsion rods 1246 and 1247 which are secured against bending in the center thereof by appropriate means 1246' and 1247'. The torsion rods 1246 and 1247 are provided at the vehicle front end with hollow sleeves or pins 1248 and 1249, again journalled at the vehicle frame, which are provided with a spline arrangement for connection with the two inwardly directed horizontal lever arms 1260 and 1261. Two draw or compression members 1250 and 1251, pivotally connected at the top and bottom thereof, represent the connection between the lever arms 1230 and 1231 of the upper guide arms 1201 and 1203.

The main torsion spring 1236 is further connected at the center thereof with a concentric tube 1252 surrounding the same which reaches forwardly up to the instrument board and is journalled at the front and rear thereof at the vehicle frame thereby simultaneously protecting the main torsion spring 1236 against bending. A lever 1253 is connected to the front end of the tube 1252 which is in the shape of a flared horn and which contains a leaf spring 1262 which may roll off along the curved inner surfaces provided by the lever 1253 so that it exhibits a progressive spring characteristic. The free end of this leaf spring 1262 is connected with a spindle 1255 by means of a rod 1254 which spindle is secured at the instrument board (not shown) and may be displaced in the transverse direction of the vehicle by means of a reversible electric motor 1263. The electric motor 1263 is automatically controlled by any suitable means responsive to the additional rear loading of the vehicle, such as, for example, a level or the like. A hand crank 1256 enables actuation of the adjustment device for the leaf spring 1262 if so desired or if the electric motor 1263 for some reason fails to operate.

*Operation*

The mode of operation of the embodiment according to Figure 20 is as follows:

The main torsion spring 1236 serves exclusively for transmitting the vehicle body weight to the four wheels and together with the elements connected to the two ends thereof forms an ideal one-point suspension, the two-dimensional moment center of which lies under the center of gravity of the vehicle body. Thus the main spring 1236 cannot transmit any primary rotating moments or forces due to natural or free oscillations to the vehicle body about the longitudinal and cross axes. The subordinate moment centers of the front wheel suspension and the rear axle which are effective for the forces about a cross axis eliminate the braking and acceleration reactions so that the vehicle does not perform the usual "kneeling" movement during braking and does not rise at the front end thereof during acceleration periods. The moment center which is effective for the forces about a longitudinal axis lies in the connecting plane passing through the points of ground contact of the front wheels and the bevel gear of the differential at a location essentially underneath the center of gravity of the vehicle body. Thus while traversing curves the vehicle body will exhibit a certain amount of inclination toward the outside of the curve. However, the same will be relatively slight as the springs which stabilize the body about the longitudinal axis, namely the two outer continuous torsion rods 1246 and 1247, may be chosen relatively hard since they are non-preloaded or unstressed and therefore do not produce any significant forces due to natural oscillations. These springs represent as equalization torsion rods two spring differentials which solely serve for purposes of stabilization about the longitudinal axis and do not transmit any forces about the cross axis. The ideal points of engagement or action thereof lie in the axes of the rods laterally of the center of gravity. For purposes of stabilization about a transverse or cross axis an independent spring is also provided, namely the leaf spring 1262 provided at the center torsion rod, which in its turn does not transmit any forces about the longitudinal axis. This spring 1262 is adjustable automatically or manually so that, on the one hand, a substantial additional load acting at the rear of the vehicle may be absorbed while, on the other hand, in normal conditions the spring forces effective about a cross axis are only slight. The aforementioned three springs for purposes of stabilization about the longitudinal and cross axes take care of such a complete horizontal stabilization of the vehicle body by reason of the fact that their primary and secondary forces correspond to the theoretical minimum and are practically exclusively pure restoring forces, so that the horizontal stabilization of the vehicle body could only be surpassed if gyroscopic stabilizing elements were provided therein. Since all the forces due to natural oscillations of all springs are very slight, none or only weak swinging dampening elements, such as shock absorbers, are necessary in the vehicle.

The complete equalization of the forces further effects for the four wheels the maximum theoretically possible adaptability thereof to the terrain unevenness and therewith a road holdability which is as great as may be achieved by the springs. The wear and tear on the tires is also reduced. Since no torsional forces may reach the vehicle body from the wheels, any measures ordinarily provided for absorbing these forces, such as cross reinforcing members of the frame, etc., may be dispensed with. However, all other parts of the vehicle such as suspension members, springs, bearings, chassis, etc. are subjected to less stress in view of the reduced swinging movements so that the life expectancy of the vehicle increases or its weight may be reduced. The complete driving quiet is also noticeable and reflected in the operating costs of a vehicle according to my invention as less energy is used for producing the swinging movements and also the internal stresses. Finally it might be mentioned that the steerability of the vehicle is improved as fewer gyroscopic moments are produced at the steering wheels in view of the lesser angular swinging movements of the vehicle body about the longitudinal axis.

It is understood, however, that numerous other modifications of vehicles of all types are possible in accordance with the principles of the present invention which will follow from those described and shown in the drawings herein and I intend to cover all such modifications and changes except as defined by the claims.

It is also within the scope of the present invention that substantial improvements may be achieved by partial use of the individual principles of my invention and for that reason the criterion for the use thereof is not to be seen in the fact that the individual requirements are not always fulfilled.

I claim:

1. In a vehicle having a vehicle body and a plurality of wheels with brake means, a spring system comprising means for connecting said wheels to said vehicle body including pre-stressed and essentially unstressed spring means to transmit the weight of said vehicle body to the wheels and to absorb forces producing a moment on said vehicle body about at least one axis respectively, said pre-stressed and unstressed spring means being effectively operative essentially independently of one another, means for equalizing the forces between the spring means of respective front and rear wheels, and joint means for suspending the wheels at said vehicle body for effective rotation about points lying essentially in the planes passing through the point of contact of corresponding wheels with the road surface and the center of gravity of the vehicle whereby the braking reaction forces are transmitted to said vehicle body in a direction essentially coinciding with lines connecting said points to said center of gravity.

2. In a vehicle having a vehicle body including a frame and a plurality of wheels, at least some of said wheels being suspended independently, means effective in a plane passing through the points of contact of the front wheels on the road and the center of gravity of the vehicle for independently suspending the front wheels from said frame, a rigid axle interconnecting the rear wheels of said vehicle, means extending from said rear axle to said independent suspension means on each side of the vehicle for interconnecting the respective front and rear wheels on each side of the vehicle to equalize the forces therebetween and to carry the weight of said vehicle body on said wheels, and means intermediate said last-mentioned means and said vehicle frame for stabilizing said vehicle body against angular vibrations about at least one cross axis.

3. In a vehicle having a vehicle body including a frame and a plurality of wheels, at least some of said wheels being suspended independently, means effective in a plane passing through the points of contact of the front wheels on the road and the center of gravity of the vehicle for independently suspending the front wheels from said frame, means extending from respective rear wheels to said independent suspension means on each side of the vehicle for interconnecting the respective front and rear wheels on each side of the vehicle and for equalizing the spring forces between respective front and rear wheels, and resilient means for stabilizing said vehicle body against angular vibrations about at least one axis and for producing restoring forces to stabilize said vehicle body in the normal position thereof.

4. In a motor vehicle having a plurality of wheels and a vehicle body carried by said wheels, at least some of said wheels being independently suspended, spring means interconnecting front and rear wheels for supporting the weight of said vehicle body on said wheels, resilient means between said wheels and said vehicle body for stabilizing said vehicle body about at least one axis, said resilient means being substantially relieved of any tension owing to the weight of the vehicle body, and means for independently suspending the front wheels of the vehicle at said vehicle body, said last named means being effective at said vehicle body substantially in a plane passing through the points of contact of the independently suspended wheels with the road and the center of gravity of the vehicle whereby the braking reaction is transmitted to said vehicle body in the direction of a line connecting said points with said center of gravity.

5. In a motor vehicle the combination according to claim 4 wherein said means for independently suspending the front wheels comprises two superposed guide arms for each wheel, said guide arms being adapted to swing about an essentially longitudinal axis, and pivot means for connecting said guide arms at said vehicle body to enable swinging movement about said longitudinal axes, said axes converging toward each other as seen in a side view and intersecting each other in said plane thereby effectively constituting a moment center for the braking reaction forces.

6. In a motor vehicle the combination according to claim 4 wherein said means for independently suspending the front wheels comprises superposed guide arms adapted to rotate about a cross axis thereof, means for pivotally supporting said guide arms at said vehicle to enable pivoting movement thereof about said cross axes, said guide arms being provided with arm portions extending, as seen in a side view, toward each other with the continuation of the axes thereof intersecting at a point lying in said plane to thereby effectively form a moment center thereat for the braking reaction portions.

7. In a motor vehicle the combination according to claim 4, wherein said means for independently suspending the front wheels comprises individual thrust arms and wherein the front wheels include non-rotating brake means, said thrust arms being connected with said brake means, and means for pivotally securing said thrust arms at said vehicle body at a point lying in said plane.

8. In a motor vehicle having a plurality of wheels and a vehicle body carried by said wheels, at least some of said wheels being independently suspended, spring means interconnecting front and rear wheels for equalizing the spring forces therebetween and for supporting the weight of said vehicle body on said wheels, resilient means between said wheels and said vehicle body for stabilizing said vehicle body about at least one axis, said resilient means being substantially relieved of any tension owing to the weight of the vehicle body, means for independently suspending the front wheels of the vehicle at said vehicle body, and means including universal joint means for suspending the rear wheels at said vehicle body, said two last-named means being effective at said vehicle body substantially in planes passing through the points of contact of respective wheels with the road and the center of gravity of the vehicle.

9. In a motor vehicle having a plurality of wheels with brake means and a vehicle body carried by said wheels, at least some of said wheels being independently suspended, spring means interconnecting front and rear wheels for equalizing the spring forces therebetween and for supporting the weight of said vehicle body on said wheels, resilient means between said wheels and said vehicle body for stabilizing said vehicle body about at least one axis, said resilient means being substantially relieved of any tension owing to the weight of the vehicle body, a rigid rear axle for the rear wheels, means for independently suspending the front wheels of the vehicle at said vehicle body, and means for suspending said rear axle at said vehicle body forwardly of said rear axle, said two last-named means being effective at said vehicle body substantially in planes passing through the point of contacts of respective wheels with the road and the center of gravity of the vehicle.

10. In a motor vehicle the combination according to claim 9 wherein said means for suspending said rear axle includes an upper longitudinal guide member and two lower cross guide members, the axis of said upper guide member converging with the axis of the lower guide members toward the vehicle center and forming a moment center for the movements of said axle.

11. In a motor vehicle, the combination according to claim 9 wherein said means for independently suspending the front wheels of the vehicle comprises superposed guide arms with the effective center of rotation thereof essentially lying in a plane passing through the points of contact of the front wheels and the center of gravity, and wherein said means for suspending said rear axle includes a three-point suspension thereof, two points of said rear axle suspension being provided along the lower part and one point of said rear axle suspension being provided on the upper part thereof.

12. In a motor vehicle the combination according to claim 9 wherein said spring means are formed as torsion rods.

13. In a motor vehicle having a plurality of wheels and a vehicle body carried by said wheels, at least some of said wheels being independently suspended, spring means interconnecting front and rear wheels for supporting the weight of said vehicle body on said wheels, resilient means between said wheels and said vehicle body for stabilizing said vehicle body about at least one axis, said resilient means being substantially relieved of any tension owing to the weight of the vehicle body, and means for independently suspending the front wheels of the vehicle at said vehicle body, said last-named means being effective at said vehicle body substantially in a plane passing through the points of contact of the independently suspended wheels with the road and the center of gravity of the vehicle whereby the braking reaction is transmitted to said vehicle body in the direction of a line connecting said points with said center of gravity, said spring means comprising torsion rods each extending substantially in the longitudinal direction between said front and rear axle, and wherein said resilient means comprise a bushing of resilient material each surrounding a respective one of said torsion rods and being attached thereto.

14. In a motor vehicle the combination according to claim 13, wherein said bushing of resilient material is located substantially in the longitudinal center of each of said torsion rods.

15. In a vehicle having a vehicle body and a plurality of wheels with brake means, a spring system comprising means for connecting said wheels to said vehicle body including pre-stressed and essentially unstressed spring means to transmit the weight of said vehicle body to the wheels and to absorb forces producing a moment on said vehicle body about at least one axis respectively, said pre-stressed and unstressed spring means being effectively operative essentially independently of one another, means for equalizing the forces between the spring means of respective front and rear wheels, and joint means for suspending the wheels at said vehicle body for effective rotation about points lying essentially in the planes passing through the point of contact of corresponding wheels with the road surface and the mutual intersection of said planes within a longitudinal plane containing the vehicle center of gravity in the vicinity of the latter whereby the braking reaction forces are transmitted to said vehicle body in a direction essentially coinciding with the lines connecting said points with said mutual intersection.

16. In a motor vehicle having a plurality of wheels and a vehicle body carried by said wheels, at least some of said wheels being independently suspended, spring means interconnecting front and rear wheels for equalizing the spring forces therebetween and for supporting the weight of said vehicle body on said wheels, resilient means between said wheels and said vehicle body for stabilizing said vehicle body about at least one axis, said resilient means being substantially relieved of any tension owing to the weight of the vehicle body, means for independently suspending the front wheels of the vehicle at said vehicle body, and means including universal joint means for suspending the rear wheels at said vehicle body, said two last-named means being effective at said vehicle body substantially in planes passing through the points of contact of the respective wheels with the road and intersecting each other in a horizontal plane passing through the center of gravity of the vehicle in the area near said center of gravity.

17. In a motor vehicle having a plurality of wheels with brake means and a vehicle body carried by said wheels, at least some of said wheels being independently suspended, spring means interconnecting front and rear wheels for equalizing the spring forces therebetween and for supporting the weight of said vehicle body on said wheels, resilient means between said wheels and said vehicle body for stabilizing said vehicle body about at least one axis, said resilient means being substantially relieved of any tension owing to the weight of the vehicle body, a rigid rear axle for the rear wheels, means for independently suspending the front wheels of the vehicle at said vehicle body, and means for suspending said rear axle at said vehicle body forwardly of said rear axle, said two last-named means being effective at said vehicle body substantially in planes passing through the points of contact of the respective wheels with the road surface and intersecting each other in a horizontal plane passing through the vehicle center of gravity in the vicinity of the latter.

References Cited in the file of this patent

UNITED STATES PATENTS

| | | |
|---|---|---|
| 1,462,638 | Hackett | July 24, 1923 |
| 2,251,698 | Willson | Aug. 5, 1941 |
| 2,354,219 | Newton | July 25, 1944 |
| 2,563,261 | Oster | Aug. 7, 1951 |
| 2,589,009 | Leighton | Mar. 11, 1952 |
| 2,653,828 | Alley | Sept. 29, 1953 |
| 2,852,269 | Gaines | Sept. 16, 1958 |

FOREIGN PATENTS

| | | |
|---|---|---|
| 658,989 | Great Britain | Oct. 17, 1951 |